United States Patent
Costantini et al.

(10) Patent No.: US 6,795,816 B2
(45) Date of Patent: Sep. 21, 2004

(54) METHOD AND DEVICE FOR TRANSLATING TELECOMMUNICATION NETWORK IP ADDRESSES BY A LEAKY-CONTROLLED MEMORY

(75) Inventors: Carlo Costantini, Casatenovo (IT); Marco Modena, Rovagnate (IT)

(73) Assignee: Alcatel, Paris (FR)

( * ) Notice: Subject to any disclaimer, the term of this patent is extended or adjusted under 35 U.S.C. 154(b) by 402 days.

(21) Appl. No.: 09/866,837

(22) Filed: May 30, 2001

(65) Prior Publication Data

US 2002/0048285 A1 Apr. 25, 2002

(30) Foreign Application Priority Data

May 31, 2000 (IT) ..................... MI2000A1202

(51) Int. Cl.[7] .............................. G06F 17/30; G06F 7/00
(52) U.S. Cl. .......................................... 707/1; 707/100
(58) Field of Search ........................... 707/1, 100, 102; 370/389, 392

(56) References Cited

U.S. PATENT DOCUMENTS

| | | | | |
|---|---|---|---|---|
| 4,933,937 A | * | 6/1990 | Konishi ...................... 370/404 |
| 5,027,350 A | * | 6/1991 | Marshall ..................... 370/401 |
| 5,136,580 A | * | 8/1992 | Videlock et al. ............ 370/403 |
| 5,287,499 A | | 2/1994 | Nemes ......................... 707/2 |
| 5,414,704 A | | 5/1995 | Spinney ....................... 370/389 |
| 5,740,171 A | | 4/1998 | Mazzola et al. ............. 370/392 |
| 5,793,763 A | | 8/1998 | Mayes et al. ................ 370/389 |
| 6,581,106 B1 | * | 6/2003 | Crescenzi et al. .......... 709/242 |
| 6,615,336 B1 | * | 9/2003 | Chen et al. ................. 711/202 |

FOREIGN PATENT DOCUMENTS

| | | |
|---|---|---|
| EP | 0854608 A2 | 7/1998 |
| WO | WO 97/40610 | 10/1997 |

OTHER PUBLICATIONS

Donald E. Knuth, "The Art of Computer Programming—Sorting and Searching", vol. 3, Second Edition, Chapter 6.4.

* cited by examiner

*Primary Examiner*—Greta Robinson
*Assistant Examiner*—Susan Rayyan
(74) *Attorney, Agent, or Firm*—Sughrue Mion, PLLC

(57) ABSTRACT

A method and device for translating telecommunication network Internet Protocol addresses by using a leaky-controlled memory. In substance, a hash computer and a memory with locations for the keys (or addresses) to be stored and corresponding locations for the updating date of the key memory location are used in combination. Should a memory address (a(j)) such that KEY=K[a(j)] be not found, a memory address corresponding to an instant and/or to an updating date elder that a certain value is occupied. In the inverse translation process, the selected address (a(j)) is received and the memory is accessed updating again the time information by inserting the current instant and/or date.

14 Claims, 2 Drawing Sheets

METHOD AND DEVICE FOR TRANSLATING TELECOMMUNICATION NETWORK IP ADDRESSES BY A LEAKY-CONTROLLED MEMORY

INCORPORATION BY REFERENCE OF PRIORITY DOCUMENT

This application is based on and claims the benefit of Italian Patent Application No. MI2000A001202 filed on May 31, 2000, which is incorporated by reference herein.

BACKGROUND OF THE INVENTION

1. Field of the Invention

The present invention pertains to the telecommunication field and in particular concerns the translation of IP (Internet Protocol) addresses used within a private network into different IP addresses which are known within another (public) network by using a leaky-controlled memory.

2. Description of the Prior Art

The growing development of telecommunications, and in particular of Internet, often creates the problems related to the connection of private networks with public networks through apparatus or network elements. Such interconnection apparatus between a first network and another network substantially have the purpose of routing the information (or packets) received from a host computer of the Internet network and deliver them to the private network host computer requesting so. On the contrary, the connection apparatus have to route the packets received from the private network to the public network. The IP (Internet Protocol) address translation from Local Network Addresses into Public Network Addresses and vice versa plays an essential role in this operation which is carried out by the interconnection apparatus.

The Network Address Translation (NAT) is described in broad terms in RFC1631 that describes the relation between NAT and CIDR (Classless Interdomain Routing) as a possible way to alleviate the problem of the IP address running out. Typically, a company with a private network associates the addresses of its private network with one or more IP addresses which are known outside. This also increases safety since each request entering or emerging from the interconnection node must be subjected to a translation process that offers the opportunity to qualify or certify the request or make it coincident with a previous request.

An evolution of the NAT translation function is represented by the NAPT (Network Address and Port Translation) function that assigns to the IP address also an identification of the interface (or port) which the packet is coming from.

The main disadvantage of both NAT and NAPT functions is that they are implemented in software and therefore they are not able to manage such a translation in real time (they do not support the so-called "wire speed"). A further disadvantage of such known solutions is that the number of public network IP addresses corresponds to the number of simultaneous accesses to Internet to be provided and therefore the reduction of the public network IP addresses may be not so considerable as instead it would be advisable. Although the situation improves through the NAPT, such a problem still remains.

SUMMARY OF THE INVENTION

In view of the known solutions and problems relevant thereto, the main object of the present invention is to develop an hardware architecture able to support the NAPT translation function with higher flexibility than the flexibility provided by the software-implemented NAPT protocol.

These and further objects are achieved by a method and a device having the features set forth in the respective independent claims. The dependent method and device claims set forth additional features. However, all the claims form an integral part of the present description.

The basic idea of the present invention consists in creating an address translation function by suitable transformation of the characteristic parameters of the input packets, subjected to expiration after a pre-established period of time. The packet characteristic parameters include the source IP address, the source TCP port and possibly the physical port ID of the interconnection apparatus. The transformation that is performed on the characteristic parameters can be defined as a hashing operation which will be better explained later on. The present invention is preferably implemented by a proper equipment, hence by hardware.

The invention will certainly result in being clear in view of the following detailed description, given by way of a mere exemplifying and non limiting example, to be read with reference to the attached drawing sheets.

BEST MODE FOR CARRYING OUT THE INVENTION

Before functionally describing the present invention, it is deemed useful to briefly mention the concept of "hashing" that will often referred to in the following description. For a better understanding of such a concept reference should be made to "The Art Of Computer Programming-Sorting And Searching" by Donald E. Knuth, Vol. 3, Second Edition, Chapter 6.4.

"Hashing" means the transformation of a character string, called key, into a string having a fixed-length value and generally shorter than the original one. Generally the hashing operation is used to index and retrive objects in a database since, of course, it is easier to find the object by using the shorter transformed key than finding it by using the original value. The hashing algorithm is called "hash function". A valuable hash function should not produce the same hash value starting from two different input data. If so, it is said that a collision occurs. At any rate, a hash function providing a low collision risk can be considered acceptable.

The present invention based upon a storage system with implicit oblivion will now be described. Firstly, the system will be described abstractly to then prosecute with the application to the NAPT (translation, storage and retrival of IP addresses).

Figure 1:
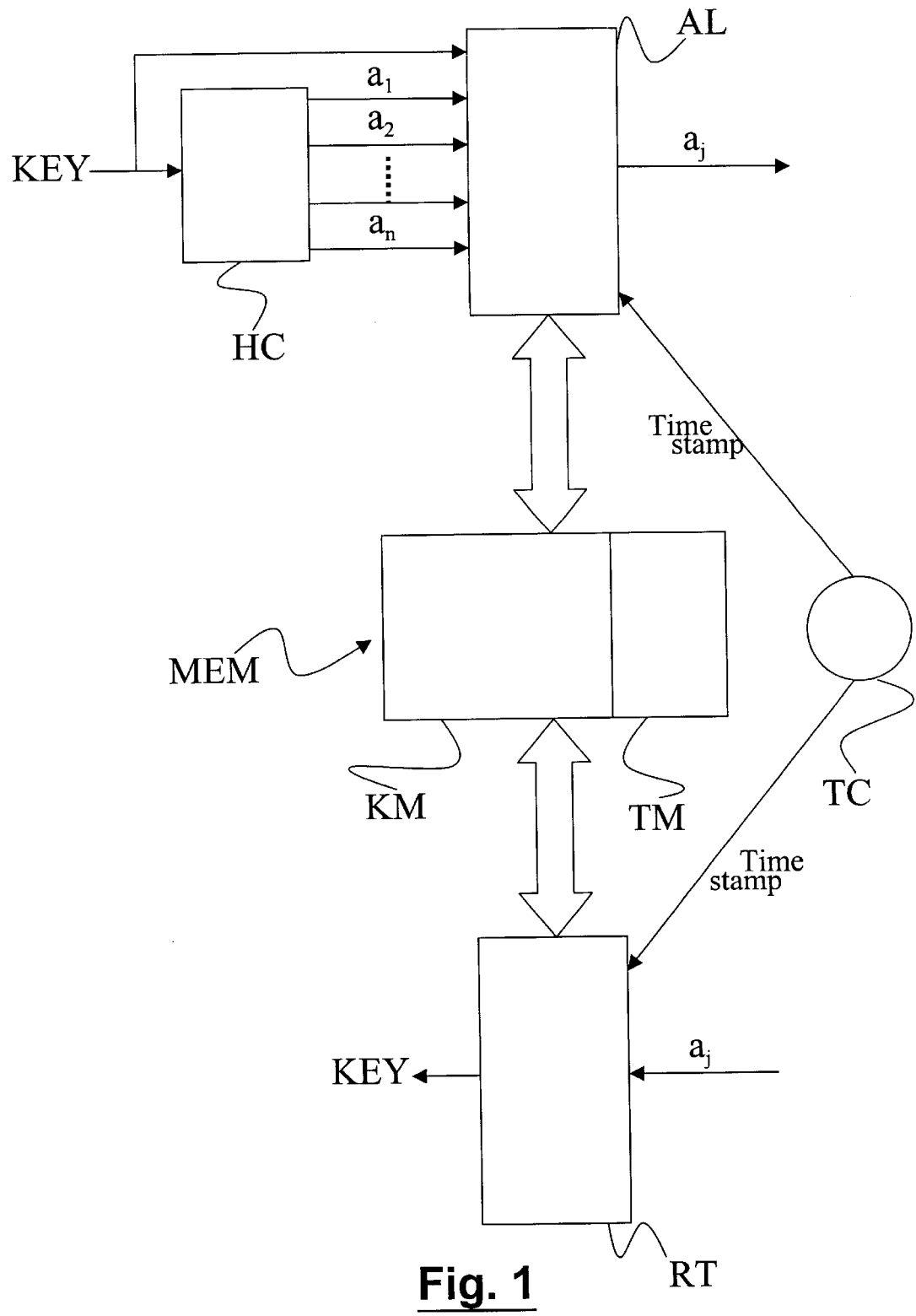
FIG. 1 shows the basic building blocks of the address translation-storage-retrival device according to the present invention.
Figure 2:
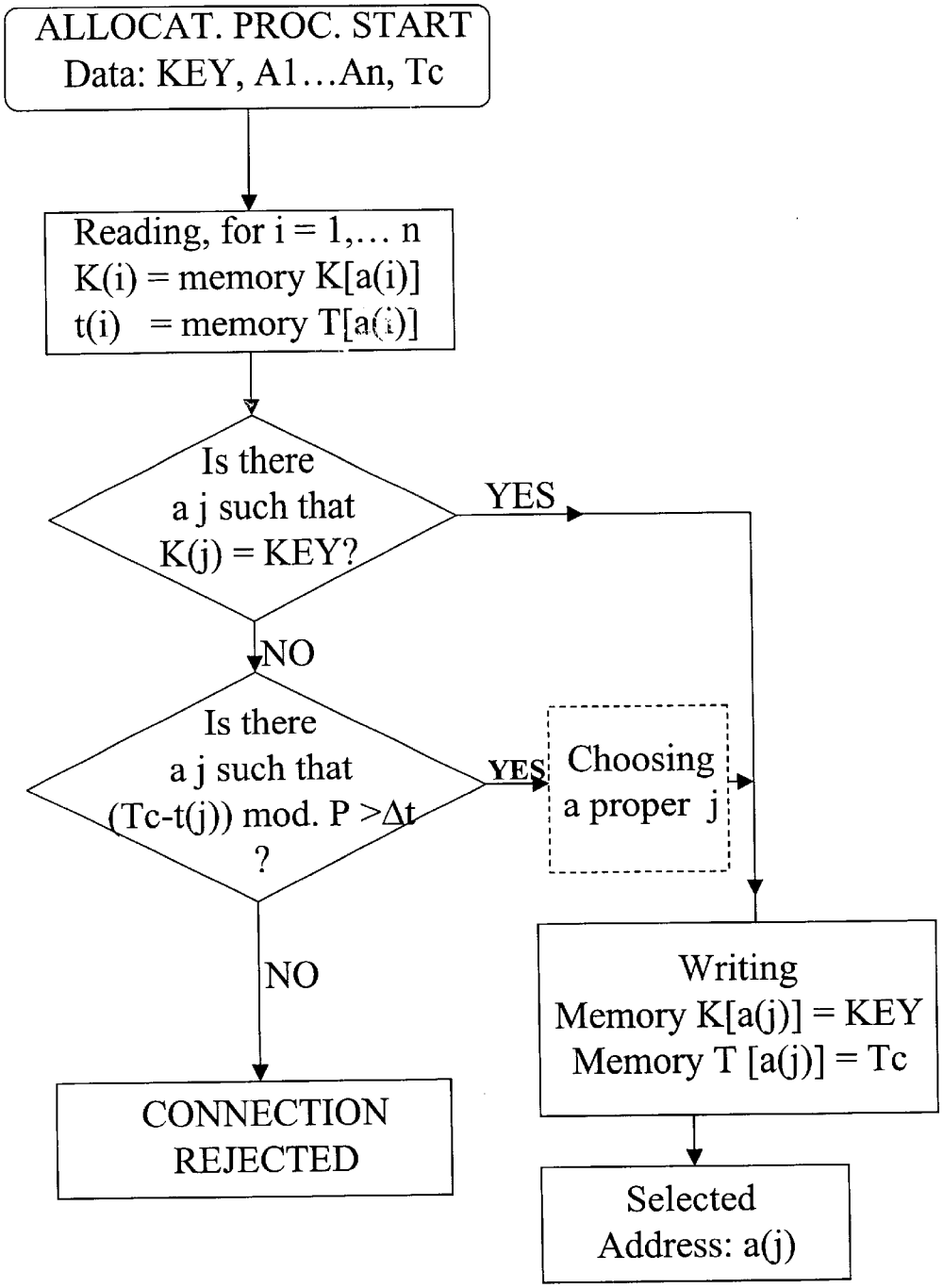
FIG. 2 is block diagram of the allocator.

An element to be stored, termed key (K), is in the form of a bit string. With reference to FIG. 1, the block HC (Hash Computer) calculates N values $h(K,i)$, with $1<=i<=N$ and $0<=h(K,i)<M$ where M is the number of available storage locations, N is the number of trials, namely it is a parameter of the system; the higher N, the more complex the device and the lower the probability that the element can not be stored. The h(.) are the aforesaid hash functions. Several ways of constructing a set of hash functions are known in the art. By way of example, however well applicable in this context, please consider the combination of the Polinomial Hashing described on page 520 with "Open Addressing with Double Hashing" described at page 528 of the above-cited publication.

Placed downstream of block HC is an Allocator (or storing) block AL that utilizes the values a(i)=h(K,i) as addresses of the memory MEM. Each location of this memory MEM contains a key (K) and a date or a time stamp T (date or time of last access). The memory MEM can comprise two different memories (a memory KM for the keys and a memory TM for the dates (or times) of last access) or only one memory with two distinct fields for the keys and the dates.

If key K has been already stored in one of the N storage locations KM, allocator AL updates the date and selects the address. On the contrary, if no key K is already present in any of the N allocations, allocator AL will examine the N dates (or times) associated thereto in memory TM.

Among the dates that are previous to the present date by a time interval $\Delta t$ greater than or equal to a pre-established value, it chooses one of them. The key K is written into the corresponding location along with the current date.

Finally, as a further option, should none of the N locations contain the key K and all the dates are recent, the storage request is rejected. Although in principle this third alternative is possible, the risk that this can happen could be greatly reduced by increasing the values of M and N.

Connected with the memory MEM is a retriver block RT. The retriever RT reads the memory at the selected address; it retrives the key and the whole information associated with the element and updates the date field with the current date.

In brief, the device according to the invention provides the step of storing elements into the memory and reading the stored elements in a simple and efficient manner; furthermore, the device discards the obsolete elements (namely those that have not been requested for some time), thus re-utilizing the memory area. Just for this reason the memory is defined "leaky-controlled (or implicitly-controlled) memory".

The choice among N locations with non-recent date could clearly be made in several ways, considered equivalent for the purposes of the present invention. For instance, the choice could be made randomly or by choosing the location with the less recent date or by choosing the first location with non-recent date, etc. Depending on whether either choice criterion is used, the performances and the complexity of the system may change.

As said above, it may happen that the storage request is rejected. If for instance N=1 it is possible that two different keys $K_A$ and $K_B$ requesting to be stored point the same memory address, since it may happen that $h(K_A)=h(K_B)$. In this event only one of the two elements will be able to be stored, the other one will be rejected.

This is an event that occurs with a certain probability, the lower the memory size, the lower the probability. This probability further decreases if N increases, for example if N=2 it is more difficult that $h(K_A,1)=h(K_B,1)$ and $h(K_A,2)=h(K_B,2)$ occur simultaneously.

The number of bits used to represent the date is obviously finite. As a result, the time elapsed as from the last memory access must be calculated as a difference between the current date and the stored date. Hence, an element is declared obsolete if the elapsed time is longer than a pre-established time.

Assume now that this device is part of an interconnection equipment, at the boundary between a private network and a public network, namely consider the application to the NAPT protocol.

As it is known, every signal frame coming from a private network, for instance an Ethernet network, provided for traveling over a public network shall provide for a header comprising several pieces of information such as the source host address and also the source port number of the Transmission Control Protocol (TCP).

Therefore, on each IP packet destined to the public network and coming from a private network, the device according to the invention performs the translation from the string

[private IP Source Address, TCP Source Port Number]

into the string

[NAPT (Public) IP Source Address, NAPT TCP Port Number]

i.e. the IP Source address of the private network, which is not know to the public networks, is converted into a public source address. The number of public addresses which the private addresses can be converted into is variable, it can be equal to one, at most.

At this point the packet can be put into the public network, since it has a public sender address (SA). The return packet will have "NAPT SA" as recipient.

When the device receives the packets in return, namely with "NAPT SA" as recipient, the device must operate the inverse translation, namely from the string

[NAPT (Public) IP Address, NAPT TCP Port Number]

to the string

[Original private IP Source Address, Original TCP Source Port Number]

The (direct and inverse) translation process remains active as long as packets transit in both directions between the two ends. After a time as from the packet transited last, the connection is declared closed and the NAPT TCP Port Number can be re-utilized.

The device according to the present invention, a broad description of which has been made above, considers the fields [Private IP Source Address, TCP Source Port Number] as a key (KEY); possibly also the physical port identifier is considered as a key in the case where several private networks converge at the same node before entering the public network. This key (KEY) is sent to the hash computer HC that derives a series of memory addresses $(a_1, a_2, \ldots a_n)$ that are input to the allocator block, along with the original key and the current time (Tc). The time Tc is substantially an integer that represents the current position of the system clock or Time Counter TC. The allocator, for each i=1, 2, 3, . . . , n, performs a memory look-up and reads the values (K(i)=K[a(i)]) stored in the various storage locations and the corresponding times (t(i)=T[a(i)]). The times associated with each stored value correspond to the instant when the storage location has been updated.

The allocator, by reading in the memory KM, verifies if there is a value j such that K(j)=KEY. If this value exists, the content of such a storage location is updated again, as well as the value of the corresponding time instant is updated again. In practice it is written K[a(j)]=KEY and T[a(j)]=Tc and the allocator AL outputs the selected address a(j) which will become the source address to be used to transmit packets over the public network.

However, if the allocator, in reading in the memory KM, does not find a value j such that K(j)=KEY, it anyhow looks for an address associated with an old updating time. In other words it verifies if there is a number j such that $$(Tc-t(j)) \bmod P > \Delta t$$

where P is the period of the Time Counter TC providing the time base and $\Delta t$ is a pre-established time interval (the Time Counter TC provides the time value or the date value by using a number of bits). In other words, if a memory location exists which is occupied but it has not been updated recently, the value contained therein will be replaced by the new value, as well as the corresponding time Tc will be updated.

On the contrary, should all times be recent, the connection will be rejected. It is also possible that there is more than one value j that satisfies the above relation and in this case one of them must be chosen. This choice may occur on the ground of several considerations, as said above, for instance one may consider the storage location associated with the less recent time.

In any case, once the value of j has been chosen, one writes K[a(j)]=KEY and T[a(j)]=Tc and the allocator AL outputs the selected address [a(j)] that will become the source address (NAPT, TCP) to be utilized for sending the packets over the public network.

The inverse translation is performed by the retriever block (RT), that retrieves both the private address and the original port number (TCP) from the memory. Block RT receives at its input the [NAPT(Public)IP Address, NAPT TCP Port Number] and indications on the current time Tc, indications that the Time Counter TC provides thereto.

Whenever a translation is performed, the corresponding date (time) is updated.

When the traffic related to a connection ends, the corresponding field in the memory is no longer updated. After a certain (pre-established) time, the content of the location becomes obsolete and the area can be re-utilized by the allocator for another connection.

Naturally, the allocator and the retriever do not work simultaneously (while a packet enters the private network no packets can go out from the latter). Hence, the bidirectional data bus accessing the memory and the address bus (shown with a double-head arrow) are shared by the allocator and by the retriever and they look separate for clarity of illustration only.

There have thus been shown and described a novel method and a novel device which fulfill all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A method of translating a key, said method comprising:
    subjecting said key to a hash function to derive a plurality of memory addresses;
    utilizing said plurality of memory addresses as addresses of a memory, said memory comprising a plurality of locations for keys and for time information relating to last update of said locations;
    updating said memory with a key (KEY) corresponding to a selected one of said memory addresses and with a current time and/or a current date; and
    using said selected memory address as a source address.

2. The method according to claim 1, wherein said selected memory address (a(j)) is a value corresponding to a number (j) such that K(j)=KEY in said memory and said method further comprises writing K[a(j)]=KEY and T[a(j)]=Tc into said memory, where Tc is a current time and/or date.

3. The method according to claim 1, wherein said selected memory address (a(j)) is a value corresponding to a number (j) such that K(j)≠KEY and (Tc-t(j)) mod P>$\Delta$t in the memory and said method further comprises writing K[a(j)]=KEY and T[a(j)]=Tc into said memory, where Tc is the current time and/or date, P is a system clock and $\Delta$t is a pre-established time interval.

4. The method according to claim 1, wherein said method further comprises receiving said selected memory address (a(j)), accessing a related storage location, extracting a key corresponding thereto and writing KEY=K[a(j)] and Tc=T[a(j)] into the memory, where Tc is the current time and/or date.

5. A device for translating a key, wherein said device comprises:
    a hash computer receiving at its input the key and outputting a plurality of memory addresses for a memory comprising storage locations for keys and storage locations for a system clock position corresponding to last updating/rewriting of the key location;
    an allocator block receiving at its input said plurality of memory addresses, said allocator block updating said memory with a key (KEY) corresponding to a selected one of said memory addresses and with a current time and/or a current date;
    a retriever block receiving at its input a selected memory address (a(j));
    a time counter providing the system clock current position to said Allocator block and to said retriever block;
    wherein said retriever block outputs the key stored at said selected memory address (a(j)).

6. The device according to claim 5, wherein said selected memory address (a(j)) is a value corresponding to a number (j) such that K(j)=KEY in the memory and wherein said allocator block updates the memory by writing K[a(j)]=KEY and T[a(j)]=Tc, where Tc is the current time and/or date.

7. The device according to claim 5, wherein said selected memory address (a(j)) is a value corresponding to a number (j) such that K(j)≠KEY and (Tc-t(j)) mod P>$\Delta$t, where Tc is a current time and/or date, P is a system clock period and $\Delta$t is a pre-established time interval, and in that said allocator block updates the memory by writing K[a(j)]=KEY and T[a(j)]=Tc, where Tc is the current time and/or date.

8. The device according to claim 5, wherein said retriever block receives said selected memory address (a(j)) to access the memory to extract a key and to write into the memory KEY=K[a(j)] and Tc=T[a(j)], where Tc is the current time and/or date.

9. A network element connecting one or more public telecommunication networks with one or more private telecommunication networks, further comprising a device according to claim 5.

10. A device for translating a key, wherein said device comprises:
    a hash computer receiving at its input the key and outputting a plurality of memory addresses for a memory comprising storage locations for keys and storage locations for a system clock position corresponding to last updating/rewriting of the key location;

an allocator block receiving at its input said plurality of memory addresses, said allocator block updating said memory with a key (KEY) corresponding to a selected one of said memory addresses and with a current time and/or a current date;

a time counter providing the system clock current position to said allocator block;

wherein said allocator block outputs said selected memory address as a source address.

11. The device according to claim 10, said device further comprising a retriever block receiving at its input a selected memory address (a(j)), wherein said retriever block outputs the key stored at said selected memory address and updates the system clock position corresponding to the key location.

12. The device according to claim 10, wherein said selected memory address (a(j)) is a value corresponding to a number (j) such that K(j)=KEY in the memory and wherein said allocator block updates the memory by writing K[a(j)]=KEY and T[a(j)]=Tc, where Tc is the current time and/or date.

13. The device according to claim 10, wherein said selected memory address (a(j)) is a value corresponding to a number (j) such that K(j)≠KEY and (Tc-t(j)) mod P>Δt, where Tc is a current time and/or date, P is a system clock period and Δt is a pre-established time interval, and in that said allocator block updates the memory by writing K[a(j)]=KEY and T[a(j)]=Tc, where Tc is the current time and/or date.

14. The device according to claim 5, wherein said retriever block receives said selected memory address (a(j)) to access the memory to extract a key and to write into the memory KEY=K[a(j)] and Tc=T[a(j)], where Tc is the current time and/or date.

* * * * *